(12) United States Patent
Ichikawa

(10) Patent No.: US 9,114,763 B2
(45) Date of Patent: Aug. 25, 2015

(54) BATTERY PACK

(71) Applicant: YAZAKI CORPORATION, Minato-ku, Tokyo (JP)

(72) Inventor: Yoshiaki Ichikawa, Kakegawa (JP)

(73) Assignee: YAZAKI CORPORATION, Tokyo (JP)

( * ) Notice: Subject to any disclaimer, the term of this patent is extended or adjusted under 35 U.S.C. 154(b) by 266 days.

(21) Appl. No.: 13/728,353

(22) Filed: Dec. 27, 2012

(65) Prior Publication Data

US 2013/0181510 A1   Jul. 18, 2013

(30) Foreign Application Priority Data

Dec. 28, 2011   (JP) ................................. 2011-287927

(51) Int. Cl.
| | |
|---|---|
| *B60R 16/03* | (2006.01) |
| *B60R 16/033* | (2006.01) |
| *H01M 2/10* | (2006.01) |
| *H01M 2/20* | (2006.01) |

(52) U.S. Cl.
CPC ........... *B60R 16/033* (2013.01); *H01M 2/1083* (2013.01); *H01M 2/206* (2013.01); *H01M 2220/20* (2013.01)

(58) Field of Classification Search
None
See application file for complete search history.

(56) References Cited

U.S. PATENT DOCUMENTS

| | | | | |
|---|---|---|---|---|
| 3,694,726 A | * | 9/1972 | Cielo et al. ...................... | 363/25 |
| 4,564,797 A | * | 1/1986 | Binkley ........................ | 320/105 |
| 4,885,524 A | * | 12/1989 | Wilburn ........................ | 320/105 |
| 7,642,746 B2 | * | 1/2010 | Kim et al. ..................... | 320/112 |

FOREIGN PATENT DOCUMENTS

| | | |
|---|---|---|
| CN | 1815775 A | 8/2006 |
| JP | 2007265855 A | 10/2007 |
| JP | 2008-066093 A | 3/2008 |

OTHER PUBLICATIONS

Communication dated Sep. 22, 2014 issued by the State Intellectual Property Office of the People's Republic of China in counterpart Application No. 201210580949.4.
Communication dated Jun. 1, 2015 from the State Intellectual Property Office of the People's Republic of China in counterpart application No. 201210580949.4.

* cited by examiner

*Primary Examiner* — Rexford Barnie
*Assistant Examiner* — Terrence Willoughby
(74) *Attorney, Agent, or Firm* — Sughrue Mion, PLLC

(57) ABSTRACT

A battery pack includes a main battery pack and a sub-battery pack. Each of the main battery pack and the sub-battery pack includes a power supply including a plurality of unit cells, a service plug connector including shutoff terminals of the power supply, and an output connector including output terminals of the power supply. The output connector is in a form of a connector capable of being mated with the service plug connector and a power supply connector of a vehicle.

3 Claims, 5 Drawing Sheets

BATTERY PACK

BACKGROUND OF THE INVENTION

1. Field of the Invention

The present invention relates to a battery pack accommodating unit cells.

2. Description of the Related Art

A battery pack is installed, for example, on a vehicle. A battery pack 50 according to a first conventional example is illustrated in FIGS. 1A and 1B. The battery pack 50 according to the first conventional example includes a power supply 52 including unit cells 51, a service plug connector 54 including a pair of shutoff terminals 53 of the power supply 52, a pair of output terminals 55 of the power supply 52, and a case 56 accommodating the power supply 52. Each of the output terminals 55 is in a form of a terminal for tightening a bolt. The output terminals 55 are connected to power supply terminals 70 on the vehicle side by bolt-tightening.

A service plug grip 57 is attached to the service plug connector 54. Detaching the service plug grip 57 can shut off the power supply 52.

A battery pack 60 according to a second conventional example is illustrated in FIGS. 2A and 2B. The battery pack 60 according to the second conventional example includes a power supply 62 including unit cells 61, a service plug connector 64 including a pair of output terminals 63 of the power supply 62, a pair of output connectors 66 each including one of a pair of output terminals 65 of the power supply 62, and a case 67 accommodating the power supply 62. The output connectors 66 are connected to a pair of connectors 73 each including one of a pair of power supply terminals 72 on the vehicle side. This connecting connects the output terminals 65 with the power supply terminals 72.

A service plug grip 68 is attached to the service plug connector 64. Detaching the service plug grip 68 can shut off the power supply 62.

However, according to the first and second conventional examples, no attention is paid to adding the respective battery packs 50, 60.

On the other hand, for coping with request for increased battery capacity and the like, a battery module capable of adding the battery packs is conventionally proposed (refer to JP 2008-066093 A). As illustrated in FIGS. 3, 4A and 4B, a battery module 80 according to a third conventional example is constructed with two types of battery packs, that is, a main battery pack 81 and sub-battery packs 90. The main battery pack 81 includes a power supply 83 including unit cells 82, a pair of output terminals 84 of the power supply 83, and additional terminals 85 used for adding other battery packs to the power supply 83. The power supply 83 is accommodated in a case 86. On both side face sides of the case 86, there are provided recessed outer wall portions 86a. Each of additional terminals 85 is provided on a surface of each of the concave outer wall portions 86a.

The sub-battery pack 90 includes an additional power supply 92 including unit cells 91 and additional terminals (output terminals) 93 of the additional power supply 92. The additional power supply 92 is accommodated in a case 94. Protruding outer wall portions 94a are provided on one side face side of the case 94, and recessed outer wall portions 94b are provided on the other side face side of the case 94, respectively. Each of additional terminals 93 is provided at each of the protruding outer wall portions 94a and each of the recessed outer wall portions 94b.

Mating the protruding outer wall portions 94a of the sub-battery pack 90 with the recessed outer wall portions 86a of the main battery pack 81, the additional terminals 85 of the main battery pack 81 are connected to the additional terminals 93 of the sub-battery pack 90. Further, mating the protruding outer wall portion 94a of the other sub-battery pack 90 with the recessed outer wall portion 94b of the sub-battery pack 90, the additional terminals 93 of the sub-battery pack 90 is connected to the additional terminals 93 of the other sub-battery pack 90. The above operations can add the sub-battery packs 90 in the battery module 80.

SUMMARY OF THE INVENTION

However, according to the third conventional example, for adding the sub-battery packs 90 in the battery module 80, it is necessary to mate the recessed outer wall portions 86a of the case 86 (or the recessed outer wall portions 94b of the case 94) with the protruding outer wall portions 94a of the case 94, thus making the adding operation of the sub-battery pack(s) 90 cumbersome. Further, the additional terminals 85 are exposed to the recessed outer wall portion 86a of the case 86 while the additional terminals 93 are exposed to the recessed outer wall portion 94b or protruding outer wall portion 94a of the case 94, thus necessitating to pay attention not to cause a short-circuit accident at the time of the adding operation. The same is true of the dismounting operation of the main battery pack 81 and the sub-battery pack 90.

The present invention has been made for solving the above problems. It is an object of the present invention to provide a battery pack capable of easily and safely implement the adding and dismounting operations of the battery pack.

A battery pack according to a first aspect of the present invention is one connected to a power supply connector of a vehicle and includes a main battery pack including a power supply including unit cells, a circuit shutoff connector including shutoff terminals of the power supply, and an output connector including output terminals of the power supply. The output connector is in a form of a connector capable of being mated with the circuit shutoff connector and the power supply connector.

The battery pack according to the first aspect of the present invention may further include a sub-battery pack to be added to the main battery pack. It is preferable that the sub-battery pack include a power supply including unit cells, a circuit shutoff connector including shutoff terminals of the power supply, and an output connector including output terminals of the power supply. It is also preferable that the output connector of the sub-battery pack be in a form of a connector capable of being mated with the circuit shutoff connector of the sub-battery pack and the circuit shutoff connector of the main battery pack.

With the battery pack according to the first aspect of the present invention, connecting and disconnecting the main battery pack and sub-battery pack can be implemented by connecting and disconnecting between the power supply connector of the vehicle and the output connector and between the circuit shutoff connector and the output connector. Thus, the operations of connecting and disconnecting of the main battery pack and the sub-battery pack can be easily and safely implemented.

DESCRIPTION OF THE EMBODIMENTS

Hereinafter, an embodiment of the present invention will be explained based on drawings.

Figure 1A:
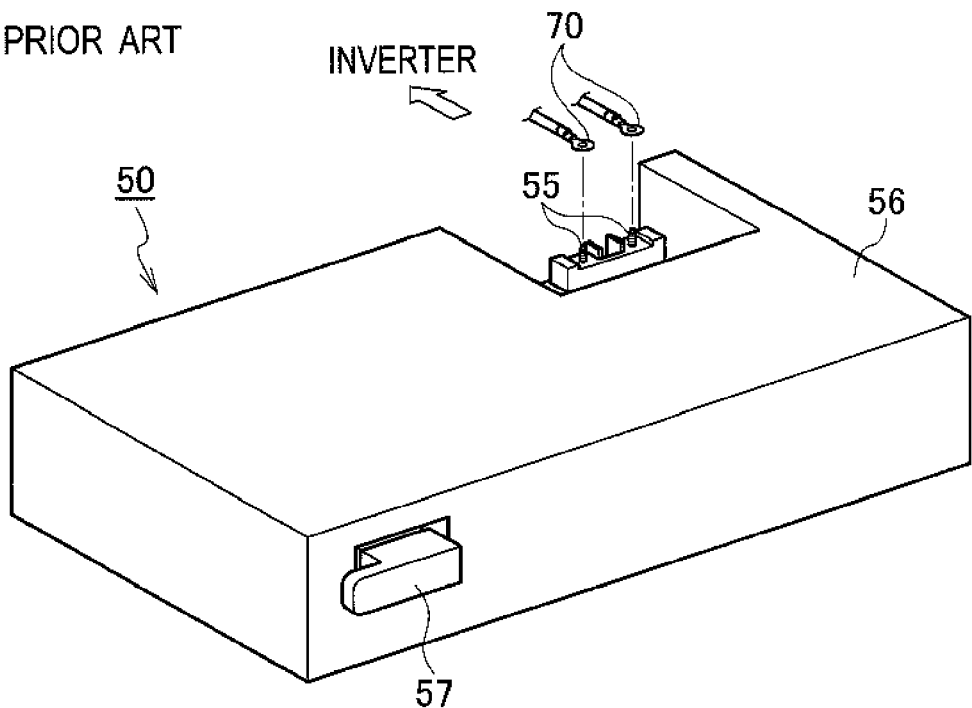
FIG. 1A is a perspective view of a battery pack according to a first conventional example and FIG. 1B is a circuit diagram of the battery pack according to the first conventional example.
Figure 1B:
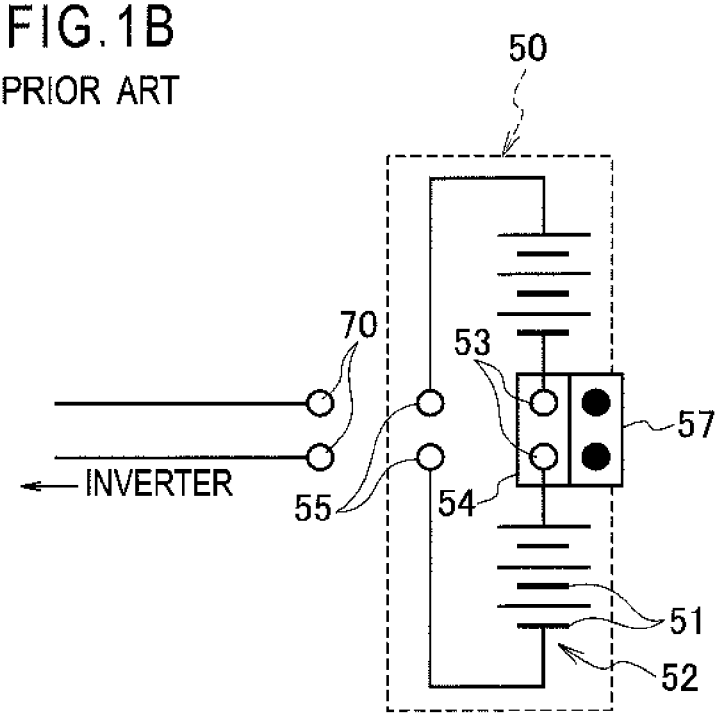
Figure 2A:
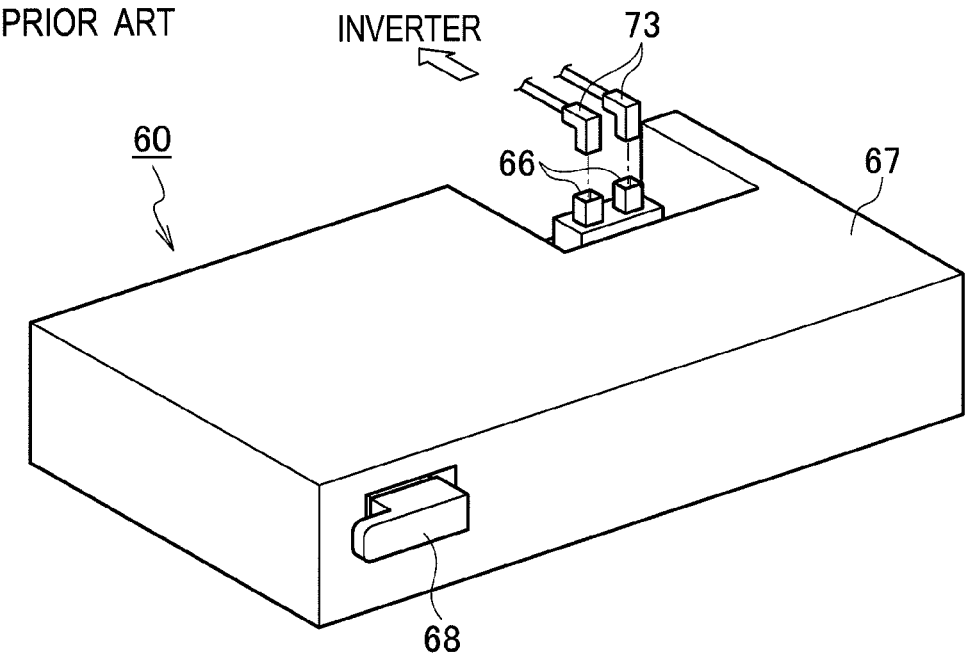
FIG. 2A is a perspective view of a battery pack according to a second conventional example.
Figure 2B:
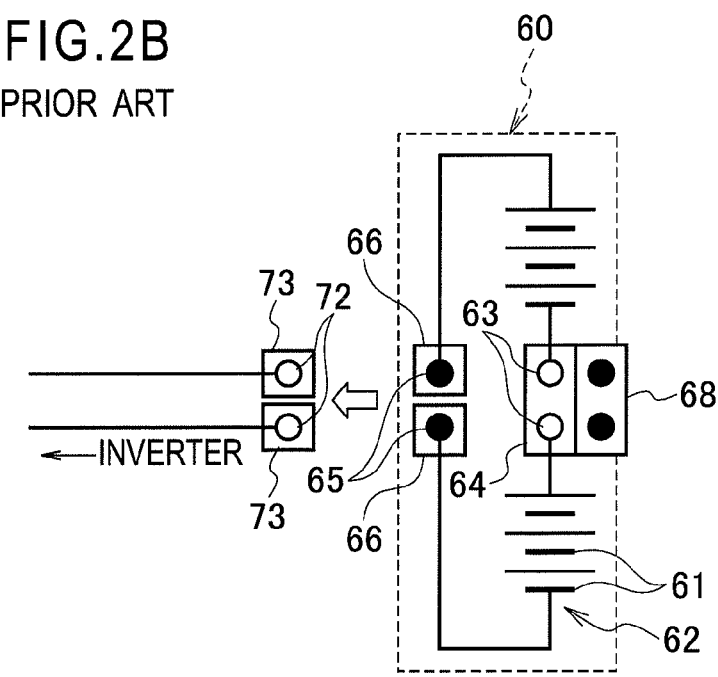
FIG. 2B is a circuit diagram of the battery pack according to the second conventional example.
Figure 3:
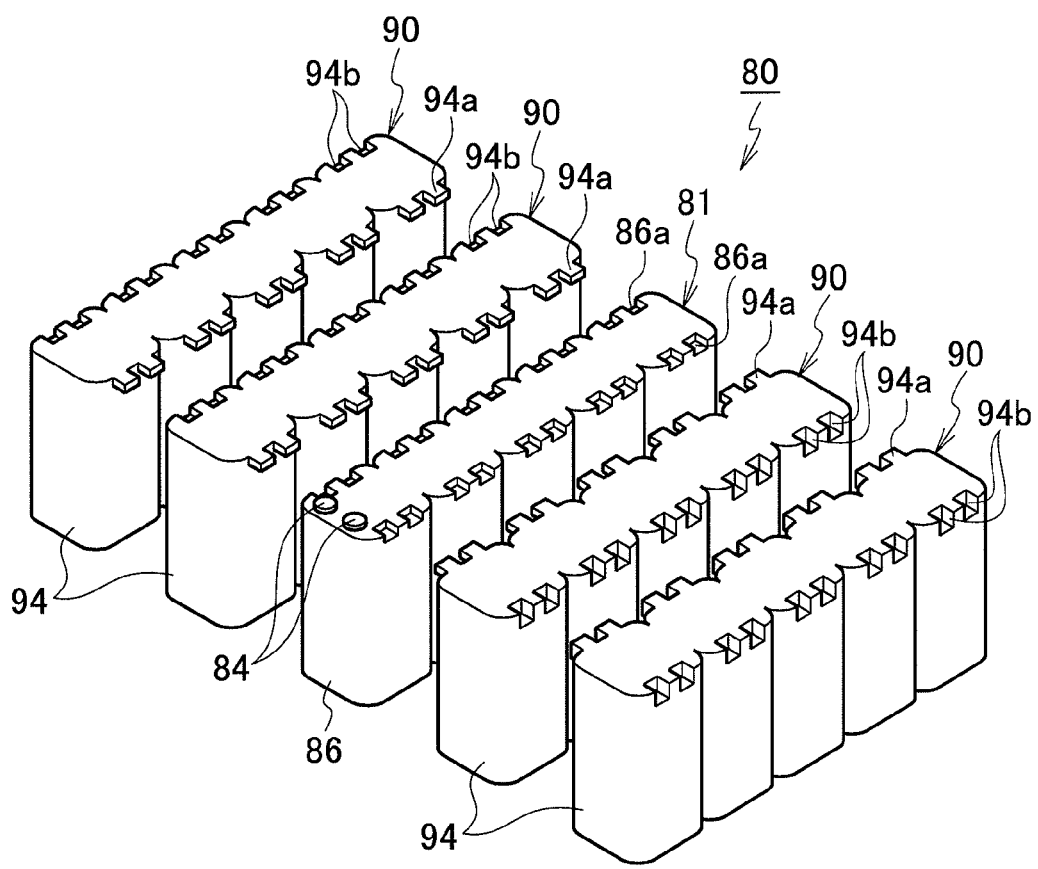
FIG. 3 is a perspective view of a battery module before adding sub-battery packs according to a third conventional example.
Figure 4A:
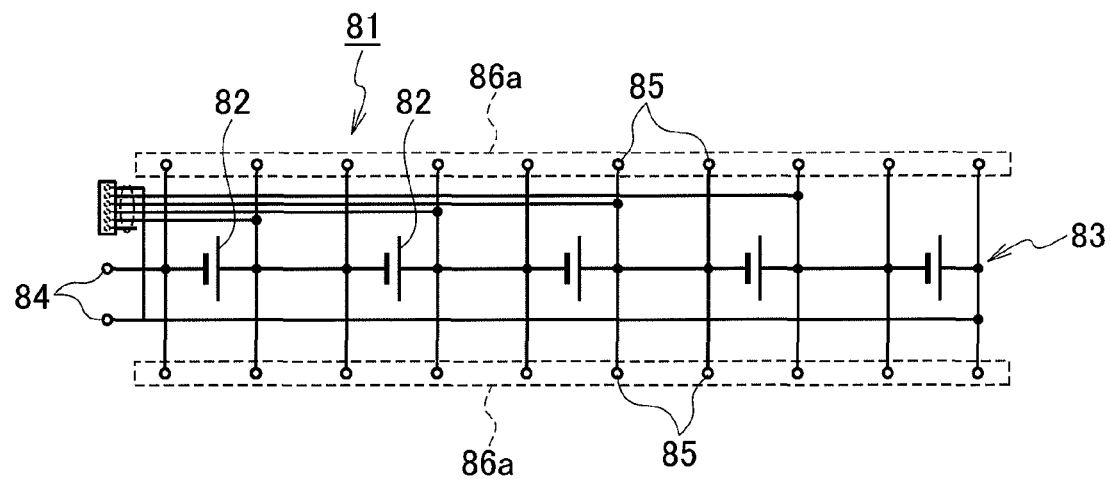
FIG. 4A is a circuit diagram of a main battery pack of the battery module according to the third conventional example.
Figure 4B:
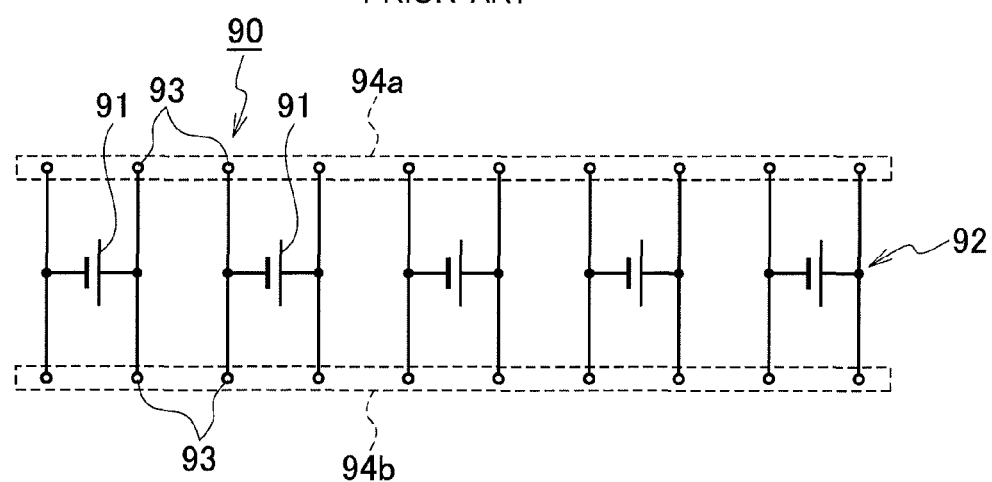
FIG. 4B is a circuit diagram of a sub-battery pack of the battery module according to the third conventional example.
Figure 5A:
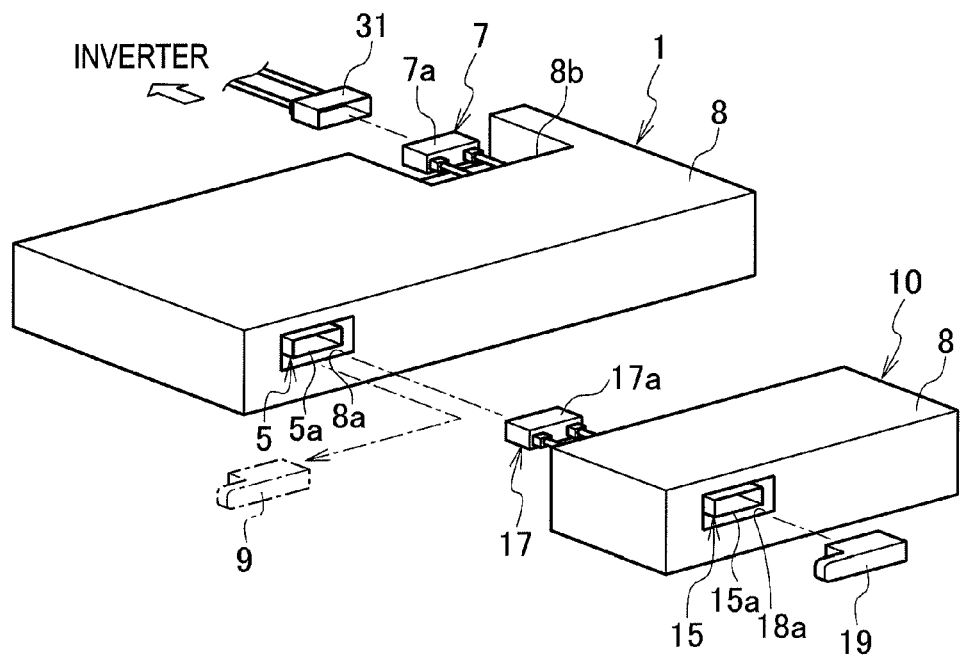
FIG. 5A is a perspective view for explaining a process of adding a sub-battery pack to a main battery pack in a battery pack according to an embodiment.
Figure 5B:
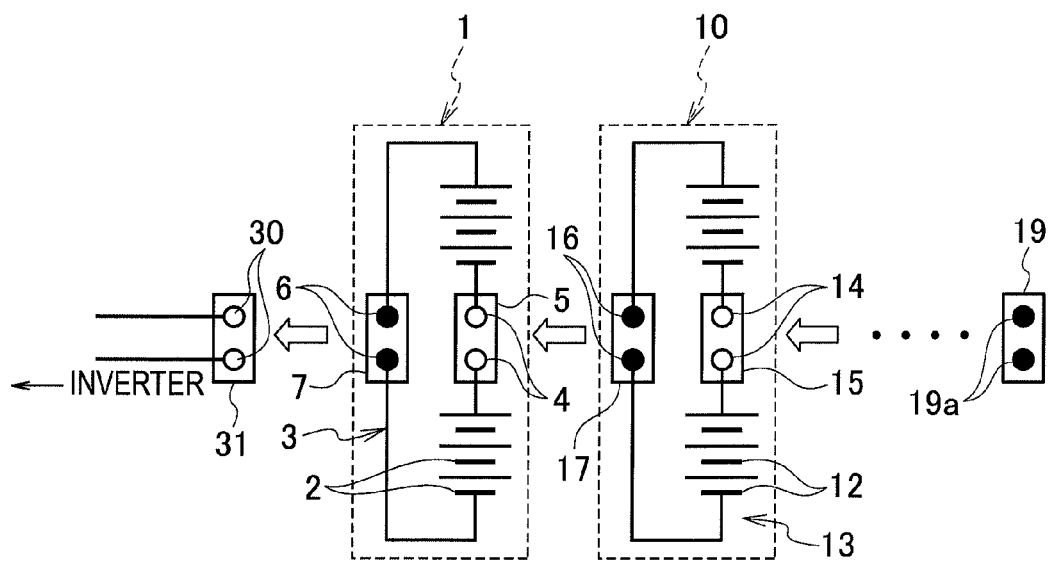
FIG. 5B is a circuit diagram with the sub-battery pack added to the main battery pack according to the embodiment.

As illustrated in FIGS. 5A and 5B, a battery pack according to the embodiment includes a main battery pack 1 and a sub-battery pack 10.

The main battery pack 1 includes a power supply 3 including unit cells 2, a service plug connector 5 as a circuit shutoff connector including a pair of shutoff terminals 4 of the power supply 3, an output connector 7 including a pair of output terminals 6 of the power supply 3, and a case 8 accommodating the power supply 3.

The power supply 3 has such a structure as having all of the unit cells 2 connected in series.

The service plug connector 5 is disposed in a connector opening 8a on a back face of the case 8. The service plug connector 5 includes a housing 5a receiving therein the pair of shutoff terminals 4. When the sub-battery pack 10 is not added, a service plug grip 9 is attached to the service plug connector 5. The service plug grip 9 includes a pair of short-circuit terminals (not illustrated) conducting with each other. When the service plug grip 9 is attached, the pair of shutoff terminals 4 get conducting with each other via the pair of short-circuit terminals, thus bringing the power supply 3 into a closed state. When the service plug grip 9 is not attached, the pair of shutoff terminals 4 get non-conducting with each other, thus shutting off the power supply 3.

The pair of output terminals 6 are voltage output terminals of the power supply 3. The output connector 7 is disposed at a recessed portion 8b on a front face of the case 8. The output connector 7 includes a housing 7a accommodating therein the pair of output terminals 6. The output connector 7 is in a form of a connector capable of being mated with the service plug connector 5. The output connector 7 is connected to a power supply connector 31 including power supply terminals 30 of the vehicle. That is, the power supply connector 31 of the vehicle has the same structure as that of the service plug connector 5. The power supply terminals 30 of the vehicle are connected to an inverter circuit.

The sub-battery pack 10 includes a power supply 13 including unit cells 12, a service plug connector 15 as a circuit shutoff connector including a pair of shutoff terminals 14 of the power supply 13, an additional connector 17 as an output connector including additional terminals 16 which are a pair of output terminals of the power supply 13, and a case 18 accommodating the power supply 13.

The power supply 13 has such a structure as having all of the unit cells 12 connected in series.

The service plug connector 15 is disposed in a connector opening 18a on a back face of the case 18. The service plug connector 15 includes a pair of shutoff terminals 14 and a housing 15a accommodating therein the pair of shutoff terminals 14. When no other sub-battery pack is to be added, a service plug grip 19 is attached to the service plug connector 15. The service plug grip 19 includes a pair of short-circuit terminals 19a conducting with each other. When the service plug grip 19 is attached, the pair of shutoff terminals 14 get conducting with each other via the pair of short-circuit terminals 19a, thus bringing the circuit into a closed state. When the service plug grip 19 is not attached, the pair of shutoff terminals 14 get non-conducting with each other, thus shutting off the power supply 13.

The additional connector 17 is disposed on the front face side of the case 18. The additional connector 17 includes a pair of additional terminals 16 and a housing 17a accommodating therein the pair of additional terminals 16. The additional connector 17 is in a form of a connector capable of being mated with each of the service plug connector 5 of the main battery pack 1 and the service plug connector 15 of the sub-battery pack 10. That is, the service plug connector 5 and output connector 7 of the main battery pack 1, the service plug connector 15 and additional connector 17 of the sub-battery pack 10, and the power supply connector 31 of the vehicle are unified in terms of connector standard.

Next, operations associated with connecting the main battery pack 1 to the vehicle side and adding the sub-battery pack(s) 10 will be explained. The output connector 7 of the main battery pack 1 is mated with the power supply connector 31 of the vehicle. This operation completes connecting of the main battery pack 1.

When the sub-battery pack 10 is to be added, the service plug grip 9 of the main battery pack 1 is detached. Next, the additional connector 17 of the sub-battery pack 10 is mated with the service plug connector 5 of the main battery pack 1. When the service plug grip 19 is not attached to the service plug connector 15 of the main battery pack 1, the service plug grip 9 detached from the main battery pack 1 is attached to the service plug connector 15 of the sub-battery pack 10. The above operations complete adding of one sub-battery pack 10. For further addition of the sub-battery pack(s) 10, the above adding operations should be repeated.

Further, dismounting of the sub-battery pack 10 and the main battery pack 1 can be realized by performing the above-described operation in reverse order.

As explained above, the main battery pack 1 (sub-battery pack 10) includes the service plug connector 5 (15) including the pair of shutoff terminals 4 (14) of the power supply 3 (13) and the output connector 7 (additional connector 17) including the pair of output terminals 6 (additional terminals 16) of the power supply 3 (13), and the output connector 7 (additional connector 17) is in a form of a connector capable of being mated with the service plug connector 5 (15).

As explained above, the battery pack according to the embodiment is connected to the power supply connector 31 of the vehicle and includes the main battery pack 1 including: the power supply 3 including the unit cells 2; the circuit shutoff connector (service plug connector) 5 including the pair of shutoff terminals 4 of the power supply 3; and the output connector 7 including the pair of output terminals 6 of the power supply 3. The output connector 6 is in a form of a connector capable of being mated with the service plug connector 5 and the power supply connector 31.

Thus, connecting and disconnecting of the main battery pack 1 can be implemented by connecting and disconnecting between the power supply connector 31 of the vehicle and the output connector 7. As described above, the connecting and disconnecting of the main battery pack 1 are implemented by connecting and disconnecting the connectors, thus enabling to easily and safely implement the connecting and disconnecting of the main battery pack 1.

Further, the battery pack according to the embodiment includes the sub-battery pack 10 to be added to the main battery pack 1. The sub-battery pack 10 includes the power supply 13 including the plurality of unit cells 12, the circuit shutoff connector (service plug connector) 15 including the pair of shutoff terminals 14 of the power supply 13, and the output connector (additional connector) 17 including the pair of output terminals (additional terminals) 16 of the power supply 13. The additional connector 17 of the sub-battery pack 10 is in a form of a connector capable of being mated with the service plug connector 15 of the sub-battery pack 10 and the circuit shutoff connector 5 of the main battery pack 1.

Specifically, the power supply connector 31 of the vehicle, the service plug connector 5 of the main battery pack 1 and the service plug connector 15 of the sub-battery pack 10 are in a form of a connector having the same structure (for example, a female connector housing), the output connector 7 of the main battery pack 1 and the additional connector 17 of the sub-battery pack 10 are in a form of a connector having the same structure (for example, a male terminal), and the female connector and the male connector capable of being mated with each other have the same standard. Thus, the connectors used for connecting the power supply system of the vehicle have one male-female type of the same standard, thus enabling to easily connect and disconnect the main battery pack 1 and the sub-battery pack 10 which have different capacities.

What is claimed is:

1. A battery pack connected to a power supply connector of a vehicle, the battery pack comprising:
   a main battery pack comprising:
      a power supply including a plurality of unit cells;
      a circuit shutoff connector comprising a pair of shutoff terminals of the power supply; and
      an output connector comprising a pair of output terminals of the power supply,
   wherein the output connector is in a form of a connector capable of being mated with the circuit shutoff connector and the power supply connector,
   wherein the main battery pack has a front face and a back face located on opposite faces of the main battery pack,
   wherein the circuit shutoff connector is disposed on the back face, and the output connector is disposed on the front face,
   wherein the front face has a recessed surface,
   wherein the output connector has a housing which accommodates the pair of output terminals, and the housing extends out from the recesse surface towards the front face of the main battery pack, and
   wherein a mating face of the pair of output terminals faces the front face of the main battery pack.

2. The battery pack according to claim 1, further comprising:
   a sub-battery pack to be added to the main battery pack, the sub-battery pack comprising:
      a power supply including a plurality of unit cells;
      a circuit shutoff connector comprising shutoff terminals of the power supply; and
      an output connector comprising output terminals of the power supply,
   wherein the output connector of the sub-battery pack is in a form of a connector capable of being mated with the circuit shutoff connector of the sub-battery pack and the circuit shutoff connector of the main battery pack.

3. The battery pack according to claim 1, wherein the output connector and the circuit shutoff connector each include a single pair of terminals.

* * * * *